No. 682,447. Patented Sept. 10, 1901.
F. BAYERDOERFER.
APPARATUS FOR RECORDING SPEED OF VEHICLES.
(Application filed Sept. 25, 1900.)
(No Model.) 4 Sheets—Sheet 1.
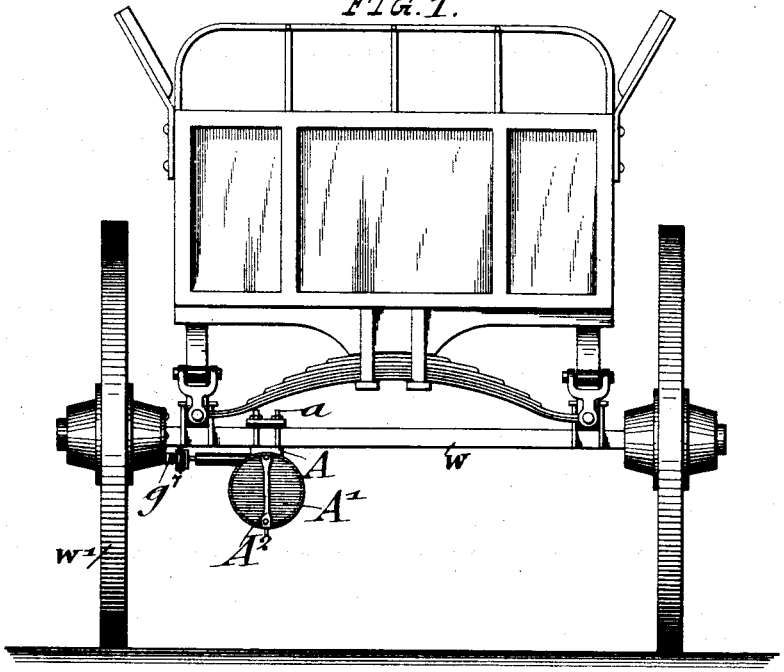
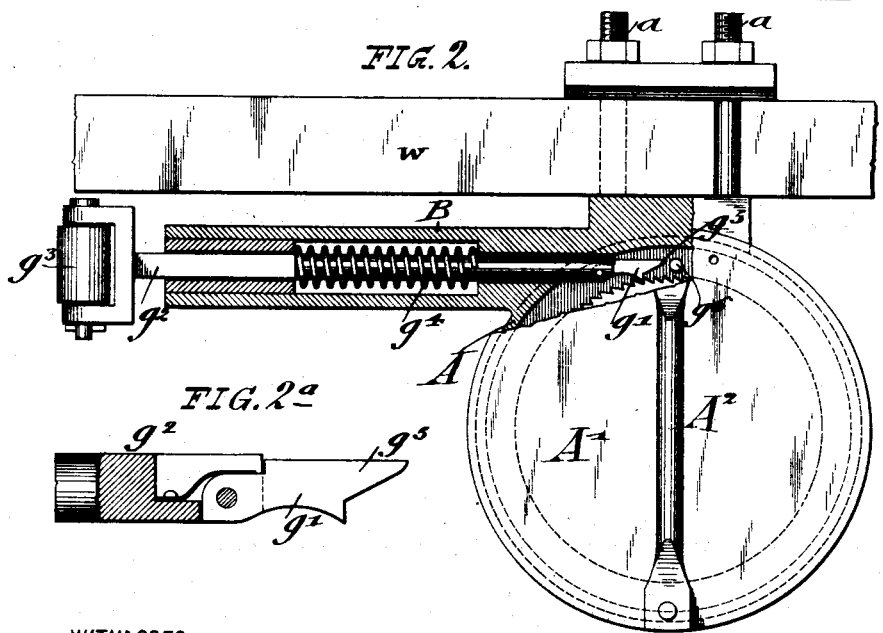
WITNESSES:
INVENTOR
Frank Bayerdoerfer
BY
ATTORNEYS No. 682,447. Patented Sept. 10, 1901.
F. BAYERDOERFER.
APPARATUS FOR RECORDING SPEED OF VEHICLES.
(Application filed Sept. 25, 1900.)

(No Model.) 4 Sheets—Sheet 2.

WITNESSES:
Bruno von Briltzingslöwen
J. H. Niles.

INVENTOR
Frank Bayerdoerfer
BY
ATTORNEYS

No. 682,447. Patented Sept. 10, 1901.
F. BAYERDOERFER.
APPARATUS FOR RECORDING SPEED OF VEHICLES.
(Application filed Sept. 25, 1900.)
(No Model.) 4 Sheets—Sheet 3.

WITNESSES:

INVENTOR
Frank Bayerdoerfer
BY
ATTORNEYS

No. 682,447. Patented Sept. 10, 1901.
F. BAYERDOERFER.
APPARATUS FOR RECORDING SPEED OF VEHICLES.
(Application filed Sept. 25, 1900.)
(No Model.) 4 Sheets—Sheet 4.
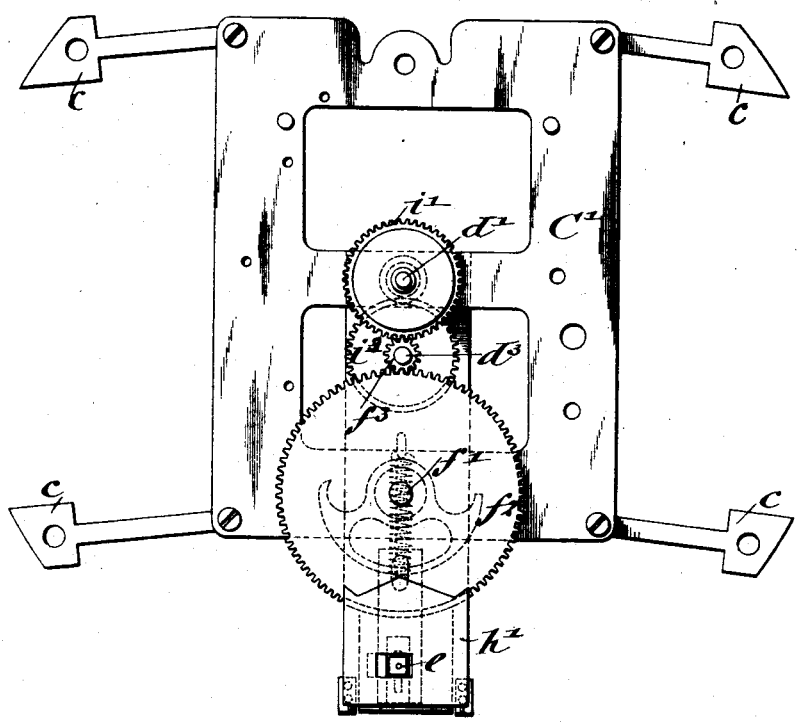
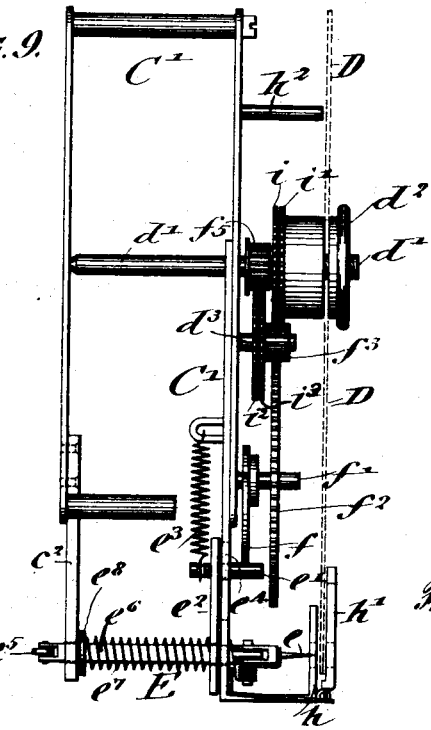
WITNESSES:
Ipens von Büttgingsloven
J. H. Niles.
INVENTOR
Frank Bayerdoerfer
BY
Louis Raegener
ATTORNEYS

UNITED STATES PATENT OFFICE.

FRANK BAYERDOERFER, OF BROOKLYN, NEW YORK.

APPARATUS FOR RECORDING SPEED OF VEHICLES.

SPECIFICATION forming part of Letters Patent No. 682,447, dated September 10, 1901.

Application filed September 25, 1900. Serial No. 31,083. (No model.)

*To all whom it may concern:*

Be it known that I, FRANK BAYERDOERFER, a citizen of the United States, residing in the city of New York, borough of Brooklyn, in the State of New York, have invented certain new and useful Improvements in Apparatus for Recording the Speed of Vehicles, of which the following is a specification.

This invention relates to an improved apparatus for recording the speed of vehicles.

The object of the invention is to provide an apparatus of this kind which can be applied to cabs and delivery-wagons of express companies, breweries, department stores, &c., so that the time made by the driver can be determined for record.

The invention consists of an apparatus for recording the speed of vehicles in which is combined with a clock-train a record-disk actuated thereby, a shiftable marking device, spring-actuated mechanism supporting the same, mechanism connected with the wheels of the vehicle for moving the marking device into contact with the disk, and a cam rotated by the clock-train in operative connection with said marking device, said cam having such form as to periodically shift said marking device from its original position, maintain the same in a shifted position, and finally permit the return of the same by its spring-actuated supporting mechanism into original position ready for the next shifting action; and the invention consists, further, in certain other combinations of operative parts, which will be fully described hereinafter and claimed.

Figure 3:
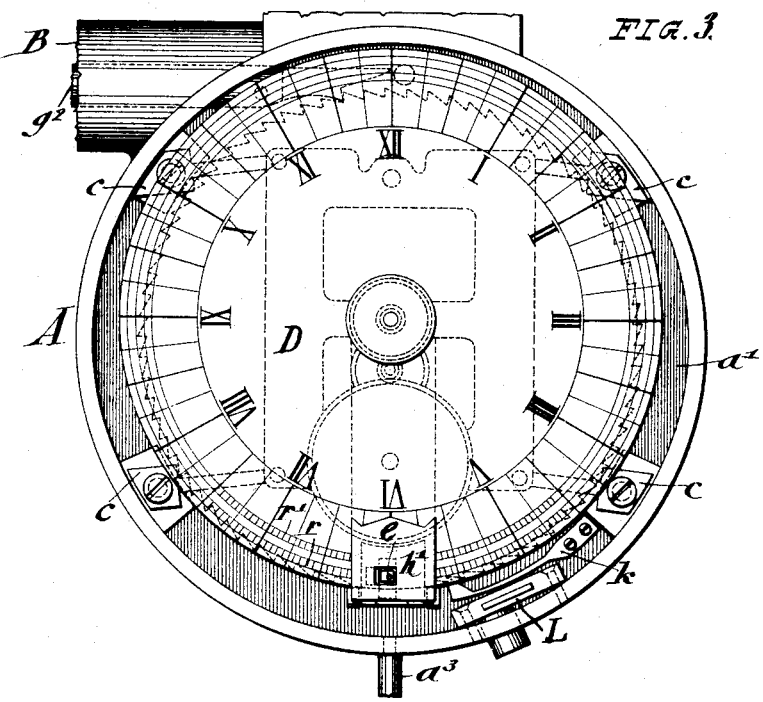
Figure 4:
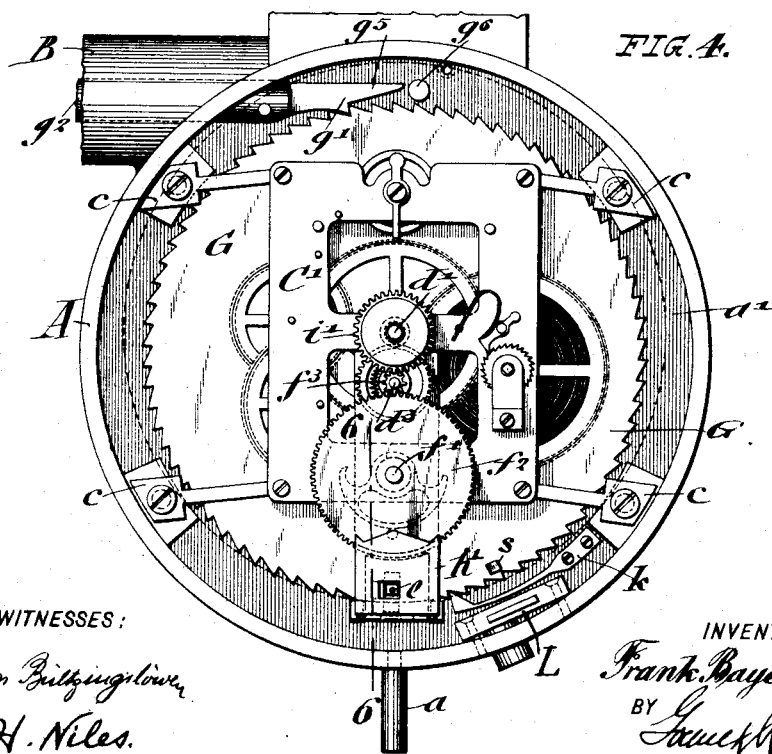
Figure 5:
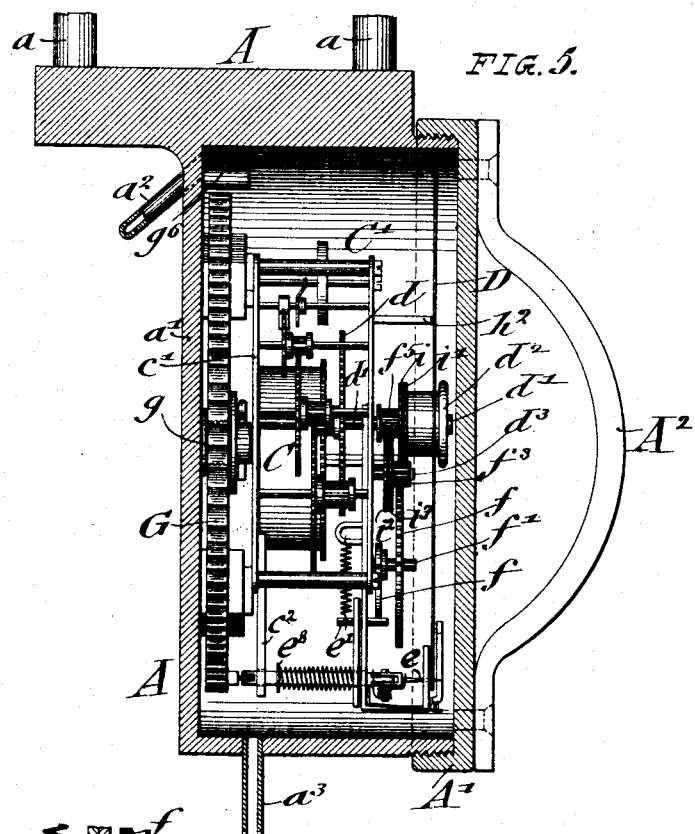
Figure 6:
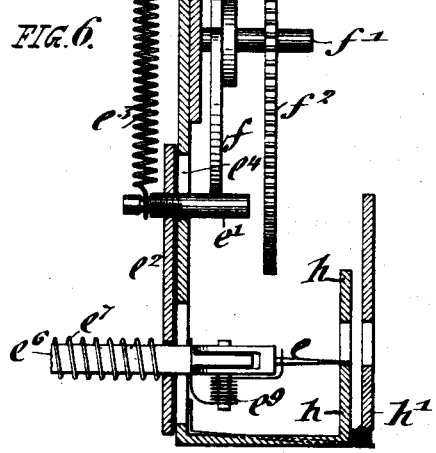
Figure 7:
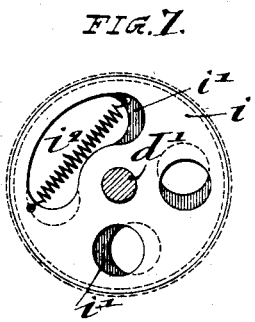

In the accompanying drawings, Figure 1 shows the apparatus as applied to a wagon. Fig. 2 is an elevation of the apparatus upon a larger scale and with parts broken away. Fig. 2$^a$ is a view in detail of the pawl actuating mechanism. Fig. 3 is a front elevation of the apparatus, the stem of the same being broken away and the cap removed. Fig. 4 is a similar elevation with the cap and record-disk removed, so as to show the operative mechanism. Fig. 5 is a vertical central section through the apparatus. Fig. 6 is a detail vertical transverse section, drawn on a larger scale, on line 6 6, Fig. 4, showing the piercing mechanism. Fig. 7 is a detail front view of one of the wheels for transmitting motion to the record-disk. Fig. 8 is a front view of the frame of the clock-train, showing the gears for operating the cam by which the marking mechanism is set for the first or second twelve hours of the day; and Fig. 9 is a side elevation of the piercing mechanism, showing its connection with the clock-train.

Similar letters of reference indicate corresponding parts.

In the drawings, A indicates the casing of the apparatus, which is made, preferably, of cylindrical shape and provided at its upper part with bolts $a\ a$ for attaching the apparatus to the axle of the vehicle in the manner shown in Fig. 1. When the apparatus is applied to heavy vehicles or is in danger of rough usage, the casing is closed by a removable screw-cap A', preferably of metal, and provided with a handle $A^2$, so that the mechanism is fully protected against injury. When the apparatus is to be used for light vehicles, however, such as cabs, the metallic cap may be replaced by a cap having a glass face, so as to permit the inspection of the record-disk at any time without removing the cap. A lock L is provided for locking the cap to the casing, so as to prevent tampering with the mechanism.

In the casing A is located a clock-train C of any suitable strong construction, the frame C' of which is attached, by means of brackets $c$, to the rear wall $a'$ of the casing. To the arbor $d'$ of the center wheel $d$ is applied a record-disk D, which is clamped in position thereon by means of a fastening-nut $d^2$, which is screwed on the front end of the arbor $d'$. The record-disk is printed like the dial of a clock, with hours and minutes, the minutes being indicated by suitable radial equidistant lines at the circumference of the disk. The clock-movement may be either a one-day or an eight-day movement. The dial is intended to be used for a day of twenty-four hours and to be rotated twice within that time and for this purpose is provided with two concentric rows $r\ r'$ of minute graduations. As a marking device a mechanism for piercing the disk is preferably employed. The piercing mechanism is shifted radially of the disk by a gear-wheel transmission from the arbor $d'$, so that the piercing-point $e$ will pierce the disk in the line $r$ during the first twelve hours of the day and in the line $r'$ during the remaining twelve hours. This is accomplished by means of a semicircular cam $f$ upon the arbor $f'$ of a gear-wheel $f^2$, which meshes by gear-wheel transmission $f^3$ $i$ $i'$ $i^2$ $i^3$ with a pinion $f^5$ on the arbor $d'$. The cam $f$, the form of which is clearly shown in dotted lines in Fig. 4, acts on a pin $e'$ of the slide-frame $e^2$ of the piercing mechanism, said slide-frame being actuated in opposite direction by a helical spring $e^3$, attached at one end to said pin and at the other end to the frame $C'$. The gear-wheel transmission from the arbor $d'$ to the cam $f$ is so constructed that the cam makes one entire rotation in twenty-four hours, during one-half of the rotation being in contact with the pin $e'$ of the slide-frame, while during the remaining time it is released from the pin, so that the piercing mechanism assumes its second position, with the pin $e'$ at the upper end of its slot $e^4$.

The piercing device is actuated upon the covering of a certain unit of distance by the vehicle, preferably one-fifth of a mile. The actuating mechanism comprises a ratchet-wheel G, mounted on a shaft $g$, between the rear wall $a'$ of the casing A and the rear plate $c'$ of the clock-frame, said ratchet-wheel being engaged by a pawl $g'$, pivoted to the end of a spring-actuated rod $g^2$, located in the stem B of the casing and carrying at its outer end an antifriction-roller $g^3$, which is located in line with a cam or stud $g^7$ upon the hub of the vehicle-wheel $w'$, as shown in Fig. 1. By this mechanism the ratchet-wheel is moved for the distance of one tooth during each rotation of the vehicle-wheel. The spring $g^4$ returns the rod $g^2$ and withdraws the pawl from the teeth after each actuation. The pawl is provided with a nose $g^5$, which rides upon a stationary pin $g^6$ of the rear wall $a'$, as shown in Fig. 4, so that the pawl is thereby lifted out of the teeth of the ratchet-wheel G and can in no case move the same forward at one actuation for more than one tooth. The pawl $k$ prevents backward movement of the ratchet-wheel G. The ratchet-wheel is divided into such number of teeth that one full rotation corresponds to the number of rotations of the vehicle-wheel equal to one-fifth of a mile. It is obvious, however, that the unit of distance employed may be any other than one-fifth of a mile. In any case the number of teeth in the wheel G is so proportioned to the size of the vehicle-wheel as to cause one rotation of said wheel G for every unit of distance of the desired length passed over by the vehicle. The ratchet-wheel G is provided near its circumference with a raised and inclined cam or stud $s$, which engages at each rotation of the ratchet-wheel an antifriction-roller $e^5$ at the end of the shank $e^6$ of the piercing-pin $e'$, so that the point $e$ is forced through the record-disk when the pin is moved longitudinally by the stud $s$. A helical spring $e^7$, interposed between a collar $e^8$ upon the shank and the slide-frame $e^2$, serves to return the pin into normal position, with the point $e$ withdrawn from the disk D after each actuation. The record-disk is guided between a stationary slotted bracket-plate $h$ and a hinged and spring-actuated bracket-plate $h'$, each of which plates is provided with an opening for the passage of the point $e$. Pins $h^2$ serve for maintaining the upper half of the disk in upright position. By swinging the hinged plate $h'$ into outward position and unscrewing the clamping-nut $d^2$ the disk can be readily removed from the clock-train and a new disk inserted. The piercing-point $e$ is pivoted to the end of the shank $e^6$ and is retained normally in line with the shank by a helical spring $e^9$. The point $e$ is so pivoted as to be movable against the tension of the spring in the direction of motion of the disk. This construction is necessary, so that in case the vehicle should come to a stop when the point is in the disk the disk will continue its motion without being prevented from doing so by the point. This yielding of the point is an important feature, as otherwise the record-disk and clock-train would be liable to be stopped. The rear end of the shank $e^6$ has sufficient play in the supporting-arm $c^2$ as to permit shifting of the forward end without binding. The slide-frame for the piercing device can be made in any other suitable manner from that shown, as I do not confine myself to this special construction. For taking up play between the gear-wheels conveying movement to the record-disk, which play would be a source of slight displacement of the disk and error in the record, special transmitting-gears are used—one on the center arbor $d'$ and one on the arbor $d^3$. They consist in each case of two independent gear-wheels arranged side by side and connected by a helical spring. Those shown in Fig. 7 are the gears $i$ $i'$ upon the center arbor, connected by a spring. The gears $i^2$ $i^3$ upon the arbor $d^3$ are connected in like manner by a similar spring.

To prevent injury to the mechanism by water, it is best to make the inclosing casing perfectly water-tight, or it may be provided with a ventilating device—for example, nipples $a^2$ $a^3$. The apparatus may be supported near the driver's seat or at any suitable point other than upon the axle $w$, and these devices may be omitted. In place of the eccentric cam or stud $g^7$ upon the hub of the vehicle-wheel any other device for actuating the mechanism may be used, and it is obvious that the apparatus may be actuated from any part of the hub and the intermediate pawl-actuating mechanism can be arranged horizontally, vertically, or in any other position, according to the position of the recording apparatus upon the vehicle.

The operation of the apparatus is as follows: Before the vehicle is sent out on the route a record-disk is placed in position upon the arbor $d'$, the time at which it is set corresponding to the hour of the day. The casing is then closed and locked and the vehicle sent off. At every successive unit of distance—say one-fifth of a mile—the piercing-pin is actuated by the mechanism described and the point *e* pierces the record-disk. If great speed is made, the perforations are close together upon the disk, while when low speed or long stoppages are made the distance of the perforations from each other indicates the fact. Upon arriving at the end of the first twelve hours of the day the shifting of the piercing mechanism occurs, so that the perforations for the remaining twelve hours are recorded in the other concentric circle of minute-graduations.

By use of my improved apparatus the driver of the vehicle can be kept within full control, because the speed at which the vehicle is driven is fully recorded and the record can be permanently preserved.

Having thus described my invention, I claim as new and desire to secure by Letters Patent—

1. The combination, with a clock-train, of a record-disk actuated thereby, a shiftable marking device, spring-actuated mechanism supporting the same, mechanism connected with the wheels of the vehicle for moving the marking device into contact with the disk, and a cam rotated by the clock-train in operative connection with said marking device, said cam having such form as to periodically shift said marking device from its original position, maintain the same in a shifted position, and finally permit the return of the same by its spring-actuated supporting mechanism into original position ready for the next shifting action, substantially as set forth.

2. In a device for recording the speed of vehicles, the combination, with a record-disk, of a piercing device supported adjacent to the disk, means for actuating the piercing device, a stationary slotted plate, means for shifting the piercing device in the slot of said plate, a movable slotted plate located adjacent to said stationary plate, and means for rotating the record-disk between said plates, substantially as set forth.

3. In a device for recording the speed of vehicles, the combination, with a record-disk, and means for moving the same, of a piercing device comprising a shank and a spring-actuated piercing-point pivoted to said shank, substantially as set forth.

4. The combination, with a clock-train, of a record-disk actuated thereby, a shiftable marking device, a spring-actuated plate supporting said marking device, mechanism connected with the wheels of the vehicle for moving the marking device into contact with the disk, and a cam rotated by the clock-train in operative connection with said supporting-plate, said cam having such form as to periodically engage and shift said plate from its original position, maintain the same in a shifted position, and finally release the same, substantially as set forth.

5. In a device for recording the speed of vehicles, the combination, with a record-disk, and means for moving the same, of a piercing device provided with a piercing-pin having a pivoted and spring-actuated point movable in the direction of motion of the disk, substantially as set forth.

6. In an apparatus for recording the speed of vehicles, the combination, with a clock-train and a record-disk applied to the center arbor thereof, of intermediate transmitting gear-wheels composed of two separate gears and springs connecting the same, so as to take up the play between the teeth and produce the accurate movement of the record-disk, substantially as set forth.

In testimony that I claim the foregoing as my invention I have signed my name in presence of two subscribing witnesses.

FRANK BAYERDOERFER.

Witnesses:
JOSEPH H. NILES,
GEO. L. WHEELOCK.